May 8, 1962 S. SCHNELL 3,032,992
POWER HYDRAULIC BRAKE DEVICE
Original Filed Jan. 26, 1955 3 Sheets-Sheet 1
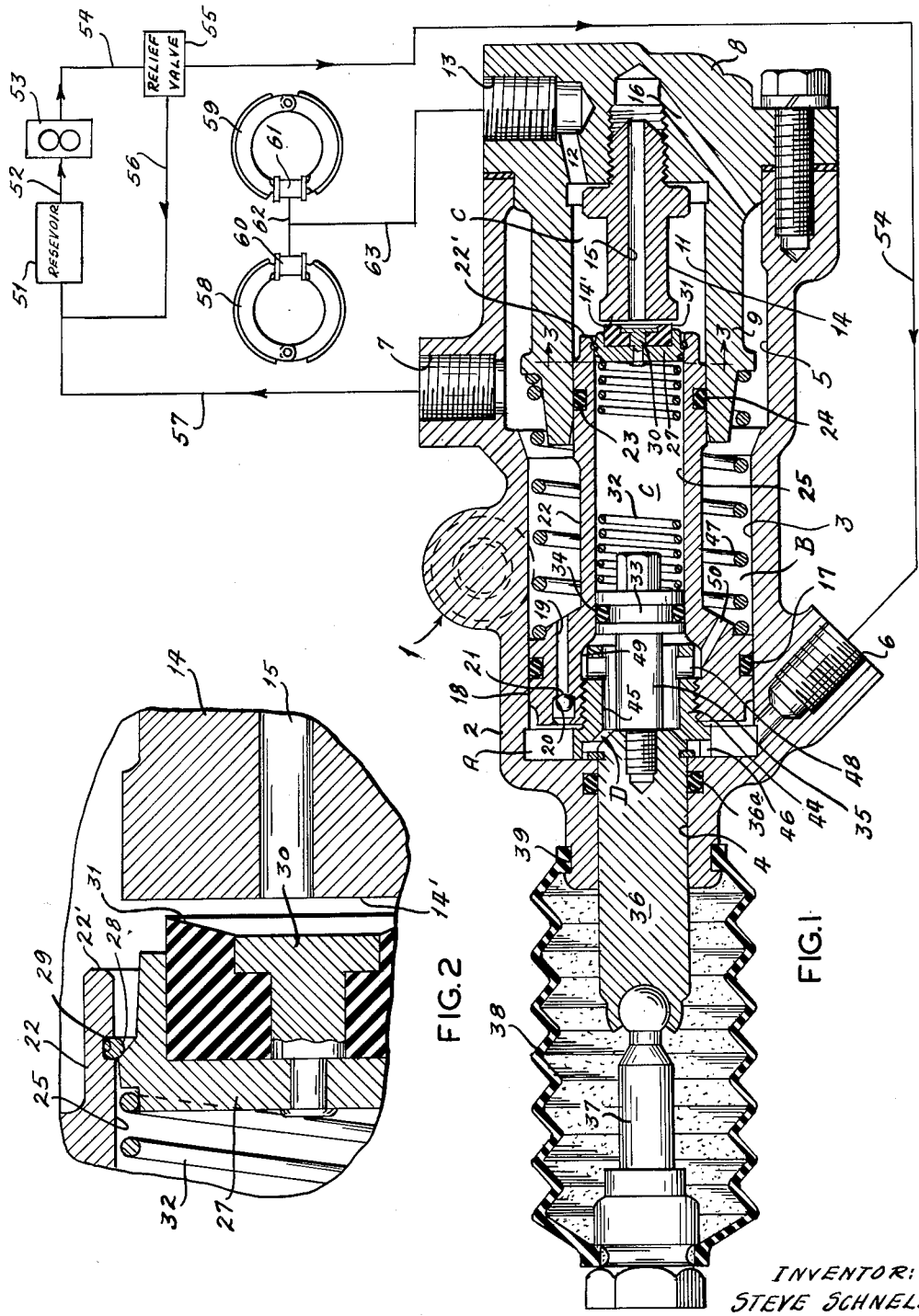
INVENTOR:
STEVE SCHNELL
BY Gravely, Lieder & Woodruff
ATTORNEYS.

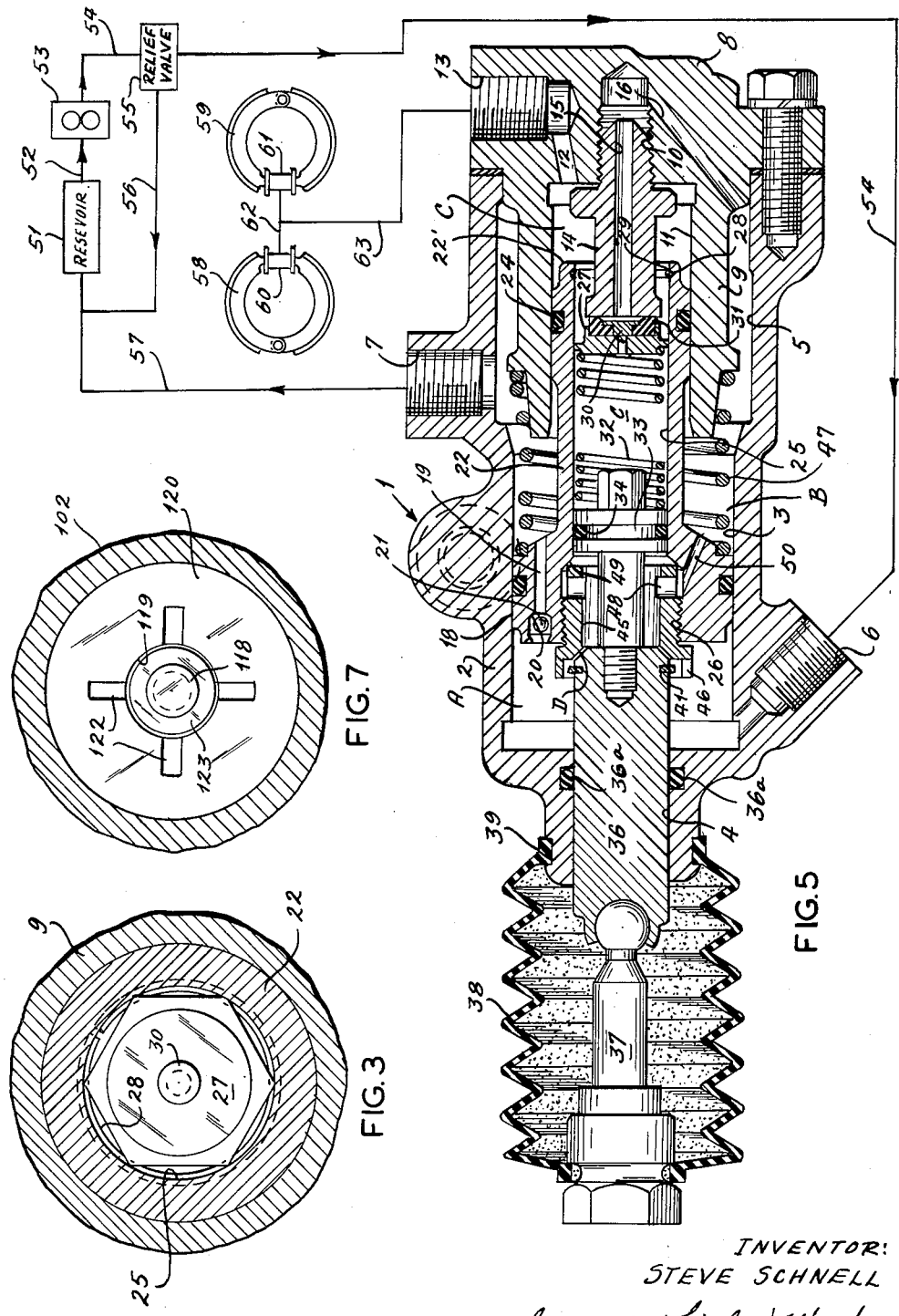

May 8, 1962
S. SCHNELL
3,032,992
POWER HYDRAULIC BRAKE DEVICE
Original Filed Jan. 26, 1955
3 Sheets-Sheet 3
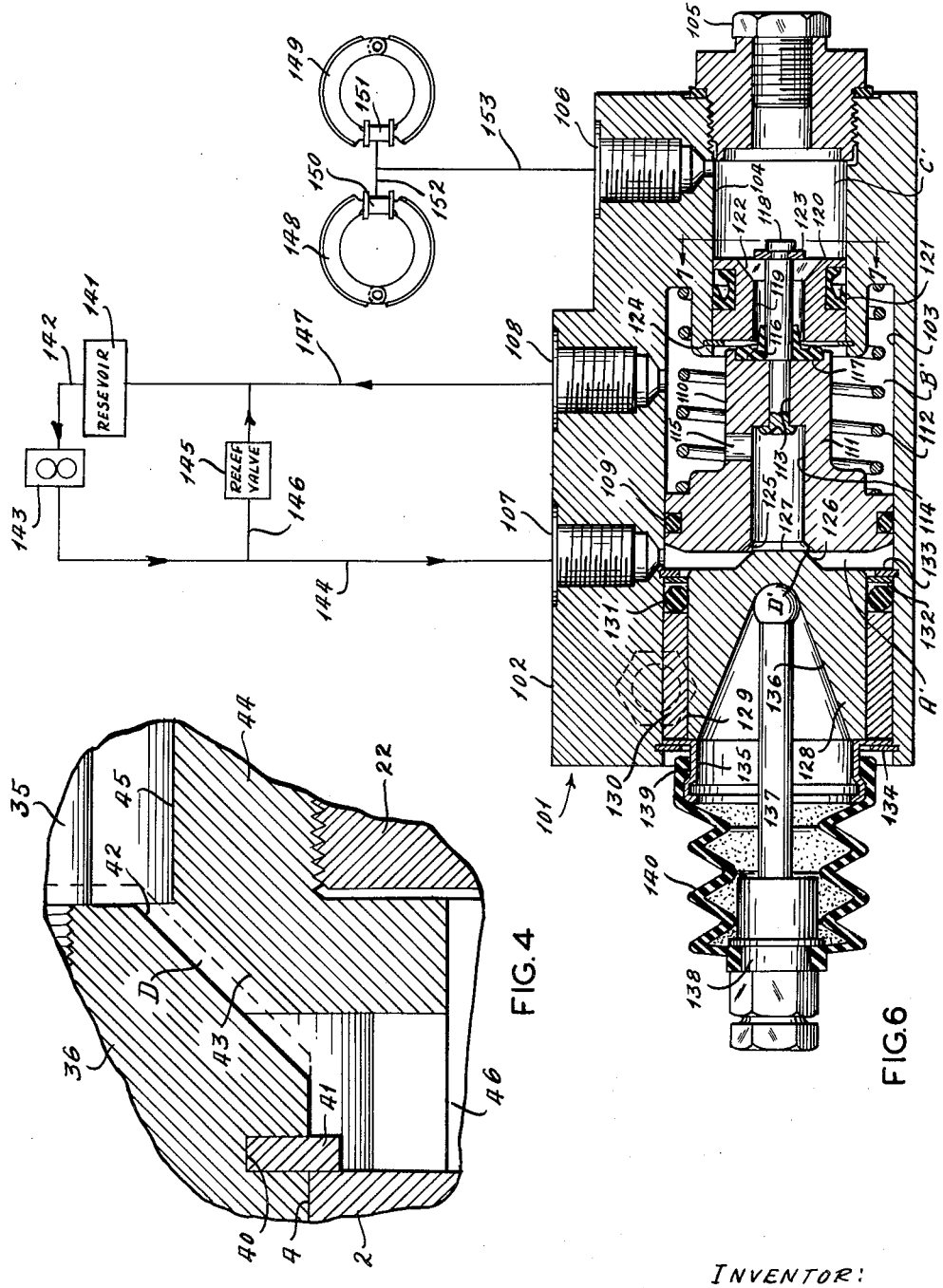
INVENTOR:
STEVE SCHNELL
BY Gravely, Lieder & Woodruff
ATTORNEYS.

United States Patent Office 3,032,992
Patented May 8, 1962

3,032,992
POWER HYDRAULIC BRAKE DEVICE
Steve Schnell, Berkeley, Mo., assignor to Wagner Electric Corporation, St. Louis, Mo., a corporation of Delaware
Continuation of abandoned application Ser. No. 484,173, Jan. 26, 1955. This application Feb. 29, 1960, Ser. No. 11,901
9 Claims. (Cl. 60—52)

This invention relates to power hydraulic braking systems and in particular to a servo motor employed therein to control said system.

The primary purpose of using power braking devices is to reduce the foot pedal travel and/or decrease the foot pedal effort required of the operator in creating a given brake actuating pressure. The present trend is to shorten the pedal stroke whereby the brake pedal can be placed even with the accelerator pedal and at the same time lighten the pedal to provide for greater ease of braking. It is possible in a conventional system to shorten the pedal stroke either by changing the pedal linkage or by using a piston of larger diameter in the master cylinder. In either of these instances the pedal effort required of the operator is increased to the extent that it could very easily be prohibitive for normal brake operation. Thus, to counteract the increased pedal effort resulting from the shortened pedal stroke, power actuated devices are employed which are capable of reducing the pedal effort more than is required to offset the shortening of the pedal stroke. In other words, by using a power device it becomes possible to both shorten the pedal stroke and to lighten or soften the pedal.

One of the principal objects of the present invention is to provide an improved servo motor employed in a power hydraulic braking system that permits the operator to directly "feel" the extent of the braking application.

Another object of the present invention is to provide a power hydraulic servo motor having a lighter brake pedal and/or a shorter pedal stroke.

Still another object of the invention is to present a power hydraulic braking system having a servo motor therein that will provide for safe brake application in the event of power failure.

Another object of the instant invention is to provide a servo motor which eliminates porthole cutting.

Another object of the instant invention is to present a power hydraulic braking system having a servo motor therein which is of comparable size to a conventional master cylinder and can easily supplant said master cylinder.

The invention also consists in the parts and in the arrangements and combinations of parts hereinafter described and claimed. In the accompanying drawings which form part of this specification and wherein like numerals and letters refer to like parts wherever they occur:

FIG. 1 is a diagrammatic view of a power hydraulic system with a longitudinal cross-sectional view of the preferred embodiment of the power hydraulic brake device shown in inoperative position, FIG. 2 is an enlarged fragmentary cross-sectional view showing the valve of the preferred embodiment in detail, FIG. 3 is a cross-sectional view of the valve taken along line 3—3 of FIG. 1, FIG. 4 is an enlarged fragmentary cross-sectional view showing in full lines the inoperative position of the throttling valve of the preferred embodiment, and in broken lines showing an actuated position thereof, FIG. 5 is a longitudinal cross-sectional view of the preferred embodiment of the power hydraulic brake device shown in an actuated position, FIG. 6 is a diagrammatic view of a modified power hydraulic brake device in a hydraulic system similar to that in FIG. 1, and FIG. 7 is a cross-sectional view taken along line 7—7 of FIG. 6.

This is a continuation of copending application Serial No. 484,173, filed January 26, 1955, for Power Hydraulic Brake Device, now abandoned.

Referring to FIGS. 1-5, servo motor 1 embodying the present invention includes a housing 2 having a cylindrical bore 3 and axially aligned counterbores 4 and 5. An inlet port 6 is angularly disposed through the lower portion of the housing 2 intersecting the bore 3 adjacent to the left end wall thereof. A return flow port 7 is vertically disposed in the upper portion of the housing 2 and intersects the counterbore 5 adjacent to the junction of said counterbore and the bore 3. The right end of the counterbore 5 is enclosed by an end plate 8 which is fixedly attached to the right end of the housing 2 with a suitable sealing means positioned therebetween. The end plate 8 is provided with an annular protrusion or tubular housing 9 extending coaxially into the bore 5 and having a threaded bore 10 and counterbore 11 axially aligned therein. A passageway 12 is angularly interposed between the right end wall of the counterbore 11 and an outlet port 13 vertically disposed in the end plate 8.

A valve seat member 14 is threadedly received in the bore 10 and extends leftwardly coaxially into the counterbore 11 and has a free end 14'. The valve seat 14 is provided with an axial passageway 15 connecting the bore 10 and the counterbore 11, the seat and right end wall of said counterbore having a suitable seal interposed therebetween. An angularly disposed passageway 16 is provided in the end plate 8 to connect the bore 10 with the counterbore 5 externally of the protrusion 9.

A power piston 18 is reciprocally received in the bore 3 adjacent to the leftward or inlet end and has a seal 17 engaged with the bore 3. An inlet chamber A is formed in the bore 3 leftwardly of the piston 18 to which the inlet 6 is in communication, and a main or return chamber B is formed in the bore 3 and counterbore 5 rightwardly of the piston 18. The main or reservoir chamber B communicates with the reservoir or return flow port 7. A plurality of pressure fluid by-pass ports 19, each having a shoulder 20 formed therein, extend through the leftward end of the piston 18 to provide a fluid by-pass between chambers A and B as will appear. The leftward ends of ports 19 are crimped to retain a ball type check valve 21 in each port 19. The piston 18 is also provided with an integral extension 22 having a working end 22' slidably mounted in the counterbore 11 in the annular protrusion 9, which counterbore 11 forms a master cylinder or pressure producing outlet chamber C. Retained in a circumferential groove 23 in the rightward or working end 22' of the extension 22 is a resilient sealing member 24 which effects a seal between the extension and the wall of the counterbore 11.

An axially aligned bore 25 and counterbore 26 are provided through the piston 18 and its extension 22. A hexagonally shaped valve 27, FIGS. 2 and 3, is slidably mounted in the cylindrical bore 25 adjacent to the working end 22' and permits free flow of fluid between the counterbore 11 and the piston bore 25 whereby the latter forms a portion or extension of the chamber C. The valve 27 is retained against movement out of the bore 25 by a stop ring 28 positioned in an internal groove 29 in the bore 25 at the rightward or free end 22' of piston extension 22. Secured to the right side of the valve 27 by a rivet 30 is a sealing cup 31 normally spaced from the free end 14' of the valve seat 14, but adapted to cooperatively engage the free end in passage sealing relation to control the flow of pressure fluid through the passageway 15 when the piston 18 is moved rightwardly to produce fluid pressures in the outlet chamber C. The stop ring 28 normally retains the valve 27 in the bore 25, the valve 27 being biased toward engagement therewith by a spring 32. The spring 32, FIG. 1, is of negligible force and extends between the valve 27 and a control piston 33 which carries a seal 34 and is slidably mounted in the bore 25. The piston 33 is formed on the right end of the piston rod 35 and is in effect an extension of a throttling rod 36 slidably mounted in the bore 4 which houses a seal 36a therein. The leftward end of the throttling rod 36 pivotally receives one end of a push rod 37 and the other end of the push rod 37 is suitable connected with an actuating pedal (not shown) having intermediate linkage or means (not shown) adapted for manual, hydraulic or other actuation. A return spring (not shown) operatively connected to the actuating pedal urges the push rod 37 and the throttling rod 36 leftwardly at all times. The push rod 37 carries one end of a resilient boot 38 while the other end of the boot is received in a circumferential groove 39 in the leftward end of the housing 2. Consequently, the servo motor 1 is protected against the entry of foreign materials through the bore 4.

Referring to FIGS. 4 and 5, the rightward end of the throttling rod 36 is provided with a circumferential groove 40 having an abutment washer or stop means 41 positioned therein, and normally abutting against the left end wall of the bore 3 when the throttling rod 36 is in inoperative position as urged leftwardly by the return spring (not shown). The piston rod 35 and the piston 33, FIGS. 1 and 5, are essentially an extension of the throttling rod 36 so that the leftward movement of the piston 33 in the piston bore 25 relative to the piston 18 is also limited by the abutment washer 41. The rightward end of the throttling rod 36, FIG. 3, has a beveled surface 42 normally spaced from a complementary beveled surface 43 of a throttling rod receiving member 44 forming a throttling channel D therebetween, the throttling rod 36 and member 44 cooperating to form a throttling valve device associated with the piston 18. The throttling valve member 44 is secured in the counterbore 26 of the piston 18 and is provided with a bore 45 concentric with said counterbore 26. A plurality of spaced fingers 46 are provided on the left end of the valve 44 permitting fluid communication between the bore 45 and the inlet chamber A of bore 3 when said fingers 46 are engaged with the end wall of bore 3 in inoperative position. A spring 47, FIGS. 1 and 5, is interposed between the protrusion 9 on the end plate 8 and the piston 18 thereby urging said piston 18 leftwardly in the bore 3 toward inoperative position. The rightward end of the bore 45 is provided with a plurality of cross-drilled or radial passageways 48 extending to a circumferential groove 49 in the rightward end of the throttling valve member 44 thereby establishing communication between the bore 45 and the counterbore 26 externally of the throttling valve. Passageway means 50 in the piston 18 connect the counterbore 26 and the chamber B of the bore 3 rightwardly of the piston.

The servo motor 1, as hereinbefore described in detail, is interposed in a power hydraulic system comprising a reservoir 51 which is connected by a conduit 52 to the inlet side of pumping means 53. The pumping means 53 in turn is connected to the inlet port 6 of the servo motor 1 by a conduit 54 having a pressure relief valve 55 interposed therein. A relief conduit 56 has one end connected to the pressure relief valve 55 and the other end intersecting another conduit 57 which connects the return flow port 7 of the servo motor 1 to the reservoir 51. To complete the power hydraulic system, wheel brake assemblies 58 and 59 are provided with actuating wheel cylinders 60 and 61 respectively which are connected by conduits 62 and 63 to the brake outlet port 13 of the servo motor 1.

Normally the pressure fluid flows from the reservoir 51 through the conduit 52 into the pumping means 53 from which it is displaced into the conduit 54 and the pressure relief valve 55. Entering the servo motor 1 at the inlet port 6, the pressure fluid normally flows into the inlet chamber A of the bore 3 to the left of the power piston 18, between the plurality of fingers 46 of the throttling valve member 44 and into the channel D formed between the member and the throttling rod 36. Therefrom, the pressure fluid flows through the bore 45 of the valve member 44 into the passageways 48 and the counterbore 26 externally of said valve. The pressure fluid then flows through the passageway 50 into the return chamber B of the bore 3 to the right of the power piston 18 back to the reservoir 51 through the return flow port 7 and the conduit 57.

When the servo motor 1 is in inoperative condition, the valve 27 abuts the stop member 28 at the working end 22' of the piston extension 22 and the sealing cup 31 is spaced from the free end 14' of the axial extension 14 so that the outlet chamber C is in communication with the fluid return chamber B through the passages 15 and 16. Accordingly, pressure fluid is permitted to flow into the outlet chamber C to compensate for any loss of fluid therefrom.

Referring to FIG. 5, when the operator actuates the servo motor 1 to effect a braking application, a force is applied to the push rod 37 to move the throttling rod 36 rightwardly relative to the power piston 18 restricting the size of the channel D formed between the rod and the throttling valve member 44 and restricting the free passage of pressure fluid being pumped therethrough. Because of this throttling action on the pressure fluid, a differential in fluid pressure is established even though the channel D is never completely closed and pressure fluid circulation to the chamber B is continuous, and this differential is proportional to the force applied by the operator. This fluid pressure differential exists across the power piston 18 acting on the effective areas of the leftward and rightward faces of the power piston 18 in chambers A and B, respectively. Therefore, the piston 18 and the integral piston extension 22 are moved rightwardly so that the working end 22' is moved in a pressure developing direction toward the outlet passage 12. The ball type check valves 21 in the by-pass ports 19 in the piston 18 sealably engages the cooperating shoulder 20 due to the established fluid pressure differential thereacross so that any pressure fluid in the fluid return chamber B of the bore 3, displaced by the rightward movement of the piston 18, flows through the return flow port 7.

The initial rightward movement of the power piston 18 and the extension 22 engages the cup 31 of valve 27 with the cooperating valve seat 14 closing the left end of the passageway 15. The piston 33 in the bore 25 and the extension 22 in the counterbore 11 displace pressure fluid therefrom through the passageway 12, the outlet port 13, the conduits 62 and 63 into the wheel cylinders 60 and 61 actuating the wheel brake assemblies 58 and 59 respectively to thereby take up the slack in the brake system. Subsequent rightward movement of the piston 33 and the extension 22 increases the fluid pressure in the bore 25, the counterbore 11, and consequently in the wheel cylinders 60 and 61. The compressive force of the spring 32 and the increased fluid pressure further forces the sealing cup 31 of valve 27 into sealable engagement with the cooperating seat 14. When the fluid pressure in the bore 25 and the counterbore 11 acting upon the effective areas of the piston 33 and the extension 22 respectively counteracts the force applied by the operator and the force created by the fluid pressure differential across the piston 18, the servo motor 1 is in a state of equilibrium so that the fluid pressure existing in the bore 25, the counterbore 11, and the braking system, will remain constant until the operator applied force is increased or decreased.

If the applied force is increased, the surface areas 42 and 43 of the throttling rod 36 and throttling valve member 44, respectively, are moved so as to more closely approximate each other as shown in broken lines in FIG. 4. Therefore, the channel D between said surface areas is further restricted and a greater fluid pressure differential is established between the faces of the power piston 18, FIG. 5. This causes the piston 18 to move farther in a pressure developing direction, and due to the applied force, the throttling rod 36 follows maintaining the desired restriction. In this manner, the piston 33 and the extension 22 are further moved rightwardly and the fluid pressure existing in the bore 25, the counterbore 11, and the wheel cylinders 60 and 61 is intensified. When the fluid pressure in the bore 25 and the counterbore 11 acting upon the effective areas of the piston 33 and the extension 22 respectively counteracts the force applied by the operator plus the force created by the fluid pressure differential across the piston 18, the servo motor 1 is again placed in a state of equilibrium so that the fluid pressure existing in the bore 25, the counterbore 11, and connected wheel cylinders 60 and 61, will remain constant until the operator applied force is again increased or decreased.

If the operator wishes to release the fluid pressure being maintained in the bore 25, the counterbore 11, and the braking system, the applied force is released from the actuating pedal (not shown) and consequently, from the push rod 37 and throttling rod 36. The force of the actuating pedal return spring (not shown) and the fluid pressure acting on the effective area of the piston 33 tend to move the throttling rod 36 to the left in FIG. 5 thereby destroying the throttling effect or restriction of channel D between the throttling rod 36 and valve member 44 and eliminating the fluid pressure differential existing across the piston 18. Since the applied force is released and the fluid pressure differential is destroyed, the compressive force of the spring 47 together with the force of the fluid pressure acting on the effective area of the working end 22′ of extension 22 moves the piston 18 leftwardly to its released or normal position. At the completion of this return movement the stop member 28 contacts the valve 27 in the bore 25 to disengage the cup 31 from the cooperating valve seat 14 thereby opening passage 15 to re-establish communication between the outlet chamber C and return chamber B through the passageways 15 and 16. Pressure fluid from the chamber B (counterbore 5) then flows through the passageways 16 and 15 into the chamber C—counterbore 11 and the piston bore 25 compensating for any pressure fluid lost during the braking application due to leakage, or to compensate for expansion or contraction of said pressure fluid.

In the event of a failure of the pumping means 53, the servo motor 1 can be actuated solely by a force applied by the operator. In this case there is no pressure fluid being pumped into the bore 3, the applied force is transmitted to the push rod 37 and the throttling rod 36 and the surface area 42 of the throttling valve 36 engages the surface area 43 of the throttling valve 44 moving the power piston 18, extension 22 and piston 33 rightwardly. Instead of being displaced from the chamber B through the return flow port 7 by the normal action of pump 53, the pressure fluid on the right side of piston 18 flows through the by-pass ports 19 into the chamber A of bore 3 to the left of the power piston 18. The initial movement of the piston 18 and the extension 22 engages the cup 22′ of valve 27 with the cooperating seat 14 closing the leftward end of the passageway 15. Subsequent rightward movement allows the piston 33 and the extension 22 in the outlet chamber C to displace enough pressure fluid from said bore 25 and counterbore 11 forming the chamber C to take up the slack in the braking system. Further movement of the piston 33 and the extension 22 displaces the fluid pressure from the chamber C to the wheel cylinders 60 and 61 by way of the conduits 62 and 63, the outlet port 13, and the passageway 12. The extension 22 is coaxial with the valve seat 14 in its rightward movement.

When the operator elects to release the manually applied force, the positive return action of the actuating pedal return spring (not shown) along with the compressive force of the spring 47 and the fluid pressure in the bore 25 and the counterbore 11, acting on the effective areas of the piston 33 and the extension 22 respectively, returns the piston 18 and throttling rod 36 to their released positions. The spring 32 maintains the sealing cup 31 seated on the valve seat 14′ until the return movement of the piston is substantially completed. In this manner, the operator can actuate the servo motor 1 to effect a braking application even though the pumping means 53 has failed although a greater effort is required of the operator to produce a given braking pressure in the system.

It is apparent from the foregoing description of the operation of the servo motor 1 that the operator is afforded a direct "feel" of the braking application in view of proportional reactionary force in opposition to the applied force affording the operator an appraisal as to the extent of the braking application. In this case, the operator "feels" the extent of braking application by the action of the fluid pressure in the piston bore 25 on the effective area of the piston 33 which is transmitted through the piston rod 35, the throttling rod 36, the push rod 37, to the actuating pedal (not shown) in opposition to the applied force thereon.

The servo motor 1 utilizes the advantageous features of a portless master cylinder by employing the valve 27 and valve seat seat 14 arrangement as previously described. By eliminating the conventional pressure fluid compensating port hole and utilizing the above mentioned arrangement to compensate through the passageway 15, there is no danger of cutting the lip of the sealing cup 31. Thus, the service life of the cup is lengthened considerably. Also, by employing this portless master cylinder method of compensation, foreign particles cannot accumulate and cause leakage past the sealing lip of the cup 31 as may occur in a conventional type master cylinder with a conventional sealing cup.

The servo motor 1 affords the operator a lighter pedal in that the applied force is opposed only by a proportional amount of the total reactionary force. The total reactionary force is the fluid pressure in the piston bore 25 and counterbore 11 of the outlet chamber C acting on the effective areas of the extension 22 and the piston 33. However, the proportion of the reactionary force directly opposing the operator applied force is the fluid pressure in the bore 25 and counterbore 11 acting only on the effective area of the piston 33. It follows that the effort required of the operator to push against a smaller proportion of the total reactionary force is less than that required to push against the total reactionary force.

The servo motor 1 also affords the operator a shorter pedal stroke along with the aforementioned lighter pedal. To obtain a shorter pedal stroke, a mechanical linkage (not shown) having a decreased pedal ratio is connected to the servo motor 1. Ordinarily, the decreased pedal ratio would increase the effort required of the operator to actuate the servo motor 1. However, the lightening of said pedal, as previously described, counteracts the effect of the increased pedal effort of the mechanical linkage having a decreased pedal ratio.

The servo motor 1 is not only flexible concerning the applied designs for certain specific situations requiring different lengths of stroke or various degrees of pedal softness, but it also approximates the size of a conventional master cylinder and, consequently, the servo motor 1 can readily supplant a conventional master cylinder and be designed to be adapted to the original mountings on any vehicle.

A modification of the preferred embodiment of the instant invention is illustrated in FIG. 6 in which a servo motor 101 having a housing 102 is provided with a counterbore 103 and a bore 104 axially aligned therewith. The rightward end of the bore 104 forms a pressure producing or outlet chamber C' enclosed by an end plug 105 fixedly mounted therein with a suitable seal interposed between the plug and the housing 102. An outlet port 106 is vertically disposed in the housing 102 intersecting the outlet bore 104 adjacent to the inner end of the end plug 105. Midway of the counterbore 103 an inlet port 107 is vertically positioned in the housing 102 and a return flow port 108 intersects the counterbore near the rightward end thereof intermediate the inlet and outlet ports 107 and 106, respectively.

A power piston 111 carrying a seal 109 and having a rightward extension 110 is slidably received in the counterbore 103 and is biased from the right end wall thereof by a return spring 112. The piston 111 divides the counterbore 103 into an inlet chamber A' in communication with the inlet port 107 and a main or return chamber B' in communication with the return port 108. The power piston 111 is provided with an axially aligned bore 113 and counterbore 114 centrally positioned therethrough. A cross-drilled passageway 115 connects the rightward end of the counterbore 114 with the return chamber B'. The rightward end of the extension 110 has an axially extending piston rod 118 mounted in the bore 113 and projecting into the outlet bore 104. An annular recess 116 is formed in the rightward end of the extension 110 around the piston rod 118, and a double lipped sealing cup 117 is seated in the recess 116 and has an inner lip in sealing engagement around a piston rod 118.

A piston member 120 having a seal 121 is slidably positioned in the outlet bore 104, and the piston rod 118 extends co-axially through a bore 119 of the piston 120. The rightward end of the piston 120 is provided with a plurality of milled slots 122 which intersect the bore 119, FIG. 7. These slots 122 and the bore 119 form a fluid passageway communicating between the reservoir chamber B' and the outlet chamber C'. A snap washer 123 is secured on the rightward end of the piston rod 118 and normally abuts against the rightward end of the piston 120 due to the biasing action of the spring 112 on the power piston 111 and normally tends to urge the piston 120 leftwardly into an abutting relationship with another snap ring or stop member 124 fixedly positioned in the leftward end of the bore 104. Therefore, the sealing cup 117 normally is positioned in spaced opposed relation close to the leftward end of the piston 120 opposite to the bore 119, and is seated on the piston member 120 and controls the pressure fluid flow through the bore 119 when the power piston 111 is moved rightwardly.

The leftward end of the counterbore 114 in the power piston 111 is provided with a beveled surface 125 which is complementary to another beveled surface 126 formed on a protrusion 127 of an actuating member or throttling valve in the form of a piston 128. Therefore, the surfaces 125 and 126 of the piston 111 and the valve 128 form a fluid pressure throttling channel or passage D' therebetween. The actuating member or valve 128 is slidably received by a bore 129 of a sleeve 130 positioned in the counterbore 103. The valve 128 is provided with a circumferential seal 131 adjacent to the rightward end of the sleeve 130 and a seal back-up washer 132 is slidably positioned between the valve 128 and the counterbore 103 and is normally positioned in abutting relationship with a snap ring 133 which is fixedly positioned in the counterbore 103 adjacent to the inlet port 107.

Another snap washer 134 is fixedly positioned in the leftward end of the counterbore 103 and normally abuts against a flange on a boot retainer 135 which is interposed between the snap washer and the leftward end of the sleeve 130. The flange of the boot retainer 135 also normally abuts against the leftward end of the actuating throttling valve 128 and retains the valve in the bore 129 of the sleeve 130. A deep recess 136 is provided in the leftward end of the valve 128 to pivotally receive one end of a push rod 137, the other end of which is connected by intermediate linkage to an actuating pedal (not shown). Retained at both ends in grooves 138 and 139 formed in the push rod 137 and the boot retainer 135 respectively is a resilient boot 140 which is provided to prevent the entry of foreign materials into the servo motor 101 through the counterbore 103.

The servo motor 101 is interposed in a power hydraulic system comprising a reservoir 141 connected by a conduit 142 to the inlet side of a pumping means 143 which is connected to the inlet port 107 of the servo motor 101 by a conduit 144. A relief valve 145 is interposed in a conduit 146 connected between the conduit 144 and another conduit 147 which is positioned between the return flow port 108 of the servo motor 101 and the reservoir 141. To complete the power hydraulic system, wheel brake assemblies 148 and 149 having wheel cylinders 150 and 151 are connected to the servo motor 101 at the outlet port 106 by conduits 152 and 153.

Normally the pressure fluid is pumped through the system and the servo motor 101 in the same manner as in the preferred embodiment of the instant invention. The servo motor 101 is also actuated much in the same manner as the preferred embodiment in that the operator applied force restricts, but does not close, the channel D' between the surfaces 125 and 126 of the power piston 111 and actuating valve 128 thereby throttling the pressure fluid being pumped therethrough and creating a fluid pressure differential across the power piston 111. In this manner the power piston moves rightwardly seating the cup 117 against the cooperating piston 120 and closing the left end of the bore 119. Subsequent movement of the piston 120 creates a fluid pressure in the outlet chamber C' and consequently in the wheel cylinders 150 and 151 actuating the wheel brake assemblies 148 and 149.

When the operator releases the applied force, the push rod 137 is moved leftwardly by the mechanical linkage (not shown) including a return spring, and the pivotal engagement with the actuating piston is temporarily interrupted. The force of the pressure fluid in the bore 104 and the compressive force of the spring 112 forces the piston 120 and the power piston 111 leftward to the released or inoperative position. The actuating valve 128 is carried leftward to its released or inoperative position by the pressure fluid being pumped between the opposing faces of the power and actuating pistons. In the released position, the push rod 137 is again pivotally received by the actuating piston 128.

In the actuation of the servo motor 101, the operator is not afforded as much of a direct "feel" as in the preferred embodiment, but the operator does "feel" the force of the fluid pressure acting against the face of the valve 128 in the inlet chamber A' in opposition to the operator applied force.

In the event of a power failure in the system, the servo motor 101 functions essentially as the preferred embodiment, as described in detail previously.

This invention is intended to cover all changes and modifications of the example of the invention herein chosen for purposes of the disclosure, which do not constitute departures from the spirit and scope of the invention.

What I claim is:
1. A hydraulic servo motor comprising a housing having a bore, a pressure responsive piston slidable in said bore dividing it to form inlet and return chambers, a passageway in said piston providing communication between said inlet and return chambers, pumping means connected to the inlet and return chambers to constantly circulate pressure fluid therethrough, normally inoperative throttling means in said inlet chamber adjacent to said pressure responsive piston and movable relative to said piston for reducing the pressure fluid passage sizes thereby developing a pressure differential between the inlet and return chambers for actuating said piston without appreciably diminishing the pressure fluid delivery rate to said return chamber, an outlet bore in said housing, pressure producing means slidable in said outlet bore and adapted to be actuated by said pressure responsive piston, outlet chamber compensation means including a by-pass passage extending between said return chamber and outlet bore and having an axially directed open end, said bypass passage normally providing pressure fluid communication between said return chamber and outlet bore, and said compensation means including a resilient valve normally spaced from said by-pass passage open end and being movable axially of the housing during operation of said pressure responsive piston for sealing said open end of said by-pass passage during initial actuation of said pressure producing means in said outlet bore.

2. A hydraulic servo motor comprising a housing having first and second bores, piston means including a first piston member slidable in said first bore and forming fluid inlet and return chambers therein, and a second piston member slidable in said second bore forming a pressure producing chamber, said first piston member having a passageway connecting said inlet and return chambers, pumping means continuously circulating pressure fluid through said inlet chamber, passageway and return chamber, throttling means projecting into said inlet chamber and cooperable with said passageway to form a pressure fluid throttling passage therebetween, said throttling means being movable relative to said first piston member between an inoperative position in which said throttling passage is unrestricted and an actuated position in which said throttling passage is restricted to provide a fluid pressure differential in said inlet and return chambers for moving said piston means in said first and second bores to develop working fluid pressures in said pressure producing chamber, means for urging said piston and throttling means toward inoperative position, and pressure fluid compensation means including a compensation passageway normally connecting said return and pressure producing chambers and a valve element carried by said piston means and spaced from said compensation passageway in inoperative position of said piston means and movable into sealed condition with said compensation passageway upon initial actuation of said second piston member.

3. The servo motor according to claim 2 wherein said first and second piston members are integrally formed, and the compensation passageway extends through said housing and said valve element being carried at the pressure producing end of said second piston member in said pressure producing chamber.

4. The servo motor according to claim 2 wherein said first and second piston members of said piston means are separate and have a lost motion connection, said members being disposed in spaced apart end opposed relationship in inoperative position, said compensation passageway being formed through said second piston member and said valve element being carried by the adjacent opposed end of said first piston member.

5. A hydraulic servo motor comprising a housing having a power chamber and a pressure producing chamber, a piston in said power chamber and having an extension with a working end slidably positioned in said pressure producing chamber, means for circulating pressure fluid through said power chamber, actuating means for developing a fluid pressure differential across said piston to actuate the working end of said extension into said pressure producing chamber, and pressure fluid compensation means for said pressure producing chamber including a passageway normally providing communication between said power and pressure producing chambers and a valve element resiliently mounted on said piston extension adjacent to said passageway and normally spaced therefrom, said valve element being moved by initial pressure producing actuation of said piston extension into passageway sealing position and being yieldable relative to said piston extension during further pressure producing movement thereof.

6. A hydraulic servo motor comprising a housing having a power chamber and a pressure producing chamber, a power piston slidable in said power chamber and having an extension with a working end slidable into said pressure producing chamber, means continuously circulating pressure fluid through said power chamber, throttling means for developing a pressure differential across said power piston to actuate the working end of said piston extension into said pressure producing chamber, said piston extension including a bore having one end in communication with said pressure producing chamber and said throttling means including a piston element slidable in the other end of said bore, and pressure fluid compensation means for supplying pressure fluid to said pressure producing chamber from said power chamber including an axial element extending into said pressure producing chamber from the end opposite to the working end of said piston extension, said axial element being aligned with and receivable into said bore, a passageway in said axial element and in said housing normally providing communication between said power and pressure producing chambers, a valve element carried in the bore of said piston extension opposite to the axial element and normally spaced therefrom, and yieldable means mounting said valve element in said bore and biasing it toward said axial element for passageway sealing engagement therewith during actuation of said power piston.

7. A hydraulic servo motor comprising a housing having a bore and a coaxial bore therein, said bore having a first end with an inlet port and a second end with a reservoir port adjacent thereto, an outlet port for said coaxial bore, a normally open connecting passage between said coaxial bore and said bore at said second end, a valve seat at one end of said connecting passage, a piston slidable in said bore adjacent to said first end and having a reduced portion slidable in said coaxial bore, a bore in said piston having one end in communication with said coaxial bore, a valve slidably positioned in said one end of said piston bore for cooperation with said valve seat, resilient means in said piston bore urging said valve toward said valve seat and permitting axial movement of said valve in said piston bore, a throttling passage through said piston providing communication between the first and second ends of said housing bore, a control piston slidable in the other end of said piston bore and including throttling means movable between an open position relative to the throttling passage providing unrestricted pressure fluid flow therethrough and a restricted position in said throttling passage developing a pressure differential across said piston to effect its actuation, whereby said valve is moved against said valve seat to close said connecting passage.

8. A hydraulic servo motor having a source of fluid pressure comprising a housing having a bore therein, said housing bore having a first end with an inlet port and a second end with an outlet port and having a reservoir port therebetween, a piston slidable in said bore and defining inlet and reservoir chambers in said bore on opposite sides of said piston and in communication with said inlet and reservoir ports, respectively, said piston normally being urged toward said inlet port, a passageway connecting said chambers, throttling means operatively positioned adjacent to said passageway and movable relative to the piston between an inoperative position and an actuated position for restricting the flow of pressure fluid through said passage developing a pressure differential across said piston in said inlet and reservoir chambers for actuating said piston, an outlet chamber adjacent to the second end of said bore in communication with the outlet port and containing pressure fluid, said piston having an annular piston extension with a working end slidably positioned in said outlet chamber in spaced relation with said outlet port and movable in said outlet chamber by actuation of said piston to develop working pressure of said pressure fluid, an axial member in said outlet chamber extending toward said piston extension, a valve member movably supported adjacent to said working end of said piston extension and normally axially spaced from said axial member, stop means preventing movement of said valve member outwardly of the working end of said piston extension, resilient means urging said valve member toward said stop member in said working end of said piston extension, a passage formed in said axial member having an opening in said outlet chamber in opposed relation with said valve member, and said passage being connected to said reservoir chamber and adapted to be closed by said valve means during actuation of said piston and piston extension to develop working pressure at the outlet port.

9. A fluid pressure producing device comprising a cylinder having a bore therein, said device having an inlet port in one end portion and an outlet port in the other end portion with a reservoir port positioned therebetween, a piston slidably mounted in said bore, said piston defining an inlet chamber in said bore adjacent to one face of said piston between said inlet port and said piston and defining a main chamber adjacent to the opposite face of said piston, a passageway connecting said inlet chamber and said main chamber, throttling means operatively positioned between said inlet port and said passageway for controlling the flow of pressure fluid therethrough, means including a passage with a check valve therein for permitting limited communication between said inlet chamber and said main chamber, said piston having an extension of smaller diameter thereon extending into said main chamber, said extension having a piston bore therein, a throttling control piston movably mounted within said piston bore for controlling said throttling means, a valve movably mounted within said piston bore biased from said throttling control piston by a spring, a protrusion in said main chamber having a bore therein for slidably receiving said extension, said protrusion bore defining an outlet chamber, said outlet chamber operatively connected with said outlet port, and a valve seat having an opening therethrough normally connecting said outlet chamber and said main chamber, said valve in said piston bore being responsive to the movement of said piston for closing the opening in said valve seat thereby preventing communication between said outlet chamber and said main chamber, and a spring normally biasing said piston toward said inlet chamber.

References Cited in the file of this patent

UNITED STATES PATENTS

| | | |
|---|---|---|
| 1,921,590 | Staude | Aug. 8, 1933 |
| 2,136,318 | Rossmann | Nov. 8, 1938 |
| 2,680,350 | Sprague et al. | June 8, 1954 |